United States Patent
Nory et al.

(10) Patent No.: US 8,761,109 B2
(45) Date of Patent: Jun. 24, 2014

(54) METHOD AND APPARATUS FOR RECEIVING A CONTROL CHANNEL

(75) Inventors: Ravikiran Nory, Buffalo Grove, IL (US); Ravi Kuchibhotla, Gurnee, IL (US); Robert T. Love, Barrington, IL (US); Vijay Nangia, Algonquin, IL (US); Murali Narasimha, Lake Zurich, IL (US); Ajit Nimbalker, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 125 days.

(21) Appl. No.: 13/566,381

(22) Filed: Aug. 3, 2012

(65) Prior Publication Data

US 2014/0036747 A1     Feb. 6, 2014

(51) Int. Cl.
*H04W 4/00*     (2009.01)

(52) U.S. Cl.
USPC ............................................. 370/329

(58) Field of Classification Search
None
See application file for complete search history.

(56) References Cited

U.S. PATENT DOCUMENTS

| | | | |
|---|---|---|---|
| 2012/0106465 A1 | 5/2012 | Haghighat et al. | |
| 2013/0194956 A1* | 8/2013 | Sartori et al. | 370/252 |
| 2013/0242750 A1* | 9/2013 | Baker et al. | 370/241 |
| 2013/0301608 A1* | 11/2013 | Frenne et al. | 370/331 |

FOREIGN PATENT DOCUMENTS

| | | |
|---|---|---|
| EP | 2214445 A1 | 8/2010 |
| EP | 2373086 A1 | 10/2011 |
| WO | 2010016726 A2 | 2/2010 |
| WO | 2010053984 A2 | 5/2010 |
| WO | 2010148132 A1 | 12/2010 |
| WO | 2012048111 A1 | 4/2012 |

OTHER PUBLICATIONS

Research in Motion et al.: "Design Consideration ofr E-PDCCH", 3GPP Draft; R1-113236(RIM-E-PDCCH Design), 3RD Generation Partnership Project (3GPP), Mobile Competence Centre; 650, Route Des Lucioles; F-06921 Sophia-Antipolis Cedex; France, vol. RAN WG1, no Zhuhai; 20111010, Oct. 4, 2011, allp ages.
Patent Cooperation Treaty, International Search Report and Written Opinion of the International Searching Authority for International Application No. PCT/US2013/051923, Oct. 16, 2013, 13 pages.
3GPP, "Design Priciple for E-PDCCH Multiplexing" May 21-25, 2012, 3GPP TSG RAN WG1 Meeting #69, R1-121976, 7.6.4, 3 pages, Prague, Czech Repbulic.

* cited by examiner

*Primary Examiner* — Clemence Han

(57) ABSTRACT

Various methods and apparatuses for receiving a control channel involve a communication device monitoring a first control and receiving information from a network regarding the configuration of a second control channel. The communication device receives an uplink grant from the network; transmits a message to the network, in which the message indicates to the network that the communication device is capable of monitoring the second control channel. The communication device monitors the second control channel based on the configuration information receiving via the first control channel.

8 Claims, 12 Drawing Sheets

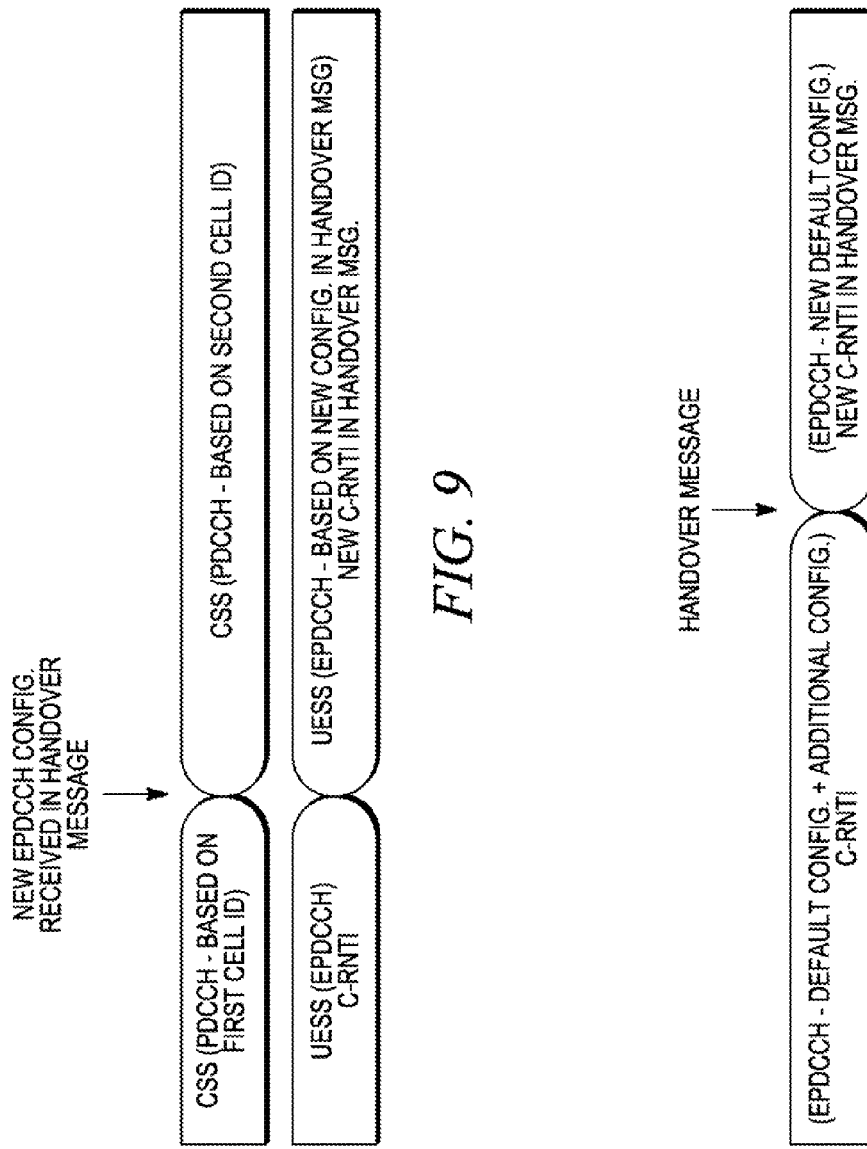

METHOD AND APPARATUS FOR RECEIVING A CONTROL CHANNEL

TECHNICAL FIELD

The present disclosure relates generally to wireless communication, and more particularly to monitoring control channels in such systems.

BACKGROUND

In wireless communication systems, especially mobile communication networks, control signaling is often necessary to support downlink data channels. Control signaling enables a device in a network to successfully receive, demodulate, and decode the downlink signals it receives. For example, in Long-Term Evolution (LTE) networks, the Physical Downlink Control Channel (PDCCH) and (for LTE Release 11 and beyond) the Enhanced Physical Downlink Control Channel (EPDCCH) are used for control signaling. The PDCCH and/or EPDCCH provides a device or User Equipment (UE) with information that allows the device to, for example, process data that is downloaded/transmitted from the network (via one or more base stations) over the Physical Data Shared Channel (PDSCH). The UEs in an LTE network typically do not "know" exactly where the PDCCH/EPDCCH control channels are located in the downlink frames received from the network, and must therefore search the frames to locate the appropriate control channels. Such searching is often challenging.

It may be the case that some UEs in LTE networks are capable of receiving an EPDCCH while other are not. Such a mismatch can introduce complications. Furthermore, some cells of an LTE network may be capable of using an EPDCCH while others are not. This may introduce more complications when a UE is handed over from one cell that is EPDCCH-capable to one that is not (or vice versa).

The various aspects, features and advantages of the invention will become more fully apparent in the following description with the accompanying drawings described below. The drawings may have been simplified for clarity and are not necessarily drawn to scale.

BRIEF DESCRIPTION OF THE DRAWINGS

FIGS. 6-12 depict various techniques for a UE to receive one or more of a PDCCH and EPDCCH under various conditions according to various embodiments of the invention.

Figure 1:
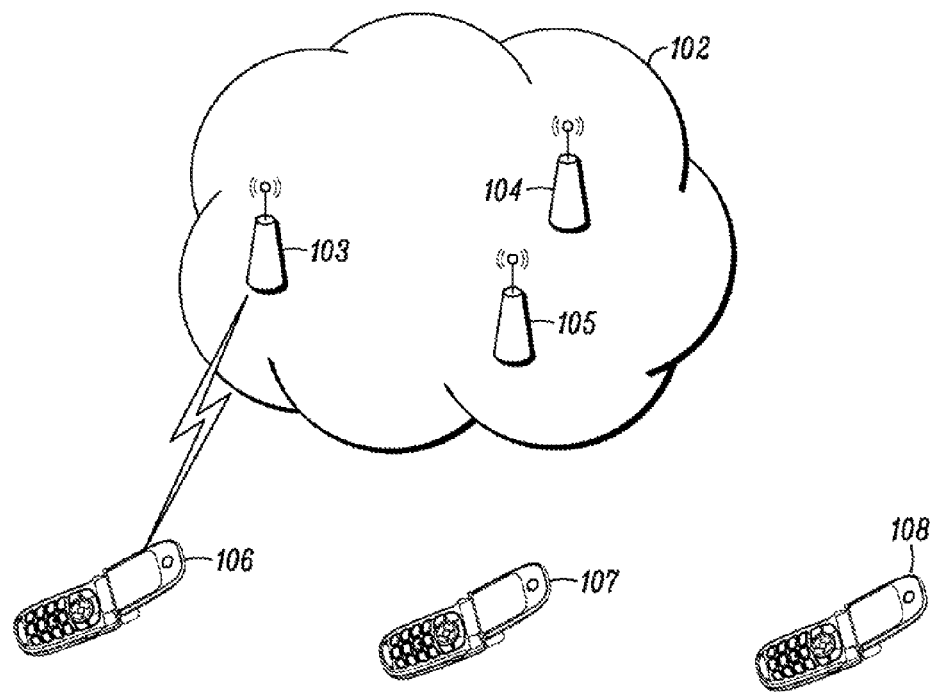
FIG. 1 depicts an example of a communication system in which various embodiments of the invention may be implemented.

In accordance with the foregoing, methods and apparatuses for receiving a control channel will now be described.

According to an embodiment of the invention, a method involves a communication device monitoring a first control channel (e.g., a first type of control channel, such as a PDCCH) and receiving information from a network regarding the configuration of a second control channel (e.g., a second type of control channel, such as an EPDCCH). The method further comprises receiving an uplink grant from the network; transmitting a message to the network, in which the message indicates to the network that the communication device is capable of monitoring the second control channel (e.g., the EPDCCH); and monitoring the second control channel based on the received configuration information of the second control channel. In an embodiment of the invention, the communication device receives the uplink grant and transmits the capability message during a random access procedure (e.g., during a RACH procedure receiving the uplink grant as part of a msg2 and transmitting the capability message as part of a new msg3, respectively).

In an embodiment of the invention, the communication device receives a transmission from a network (e.g., receiving one or more of a synchronisation signal, a broadcast channel, a Master Information Block, and a System Information Block). Based on the transmission (e.g., based on the synchronisation signal structure (e.g., synchronization sequence, position of the synchronization sequence within a subframe and/or time-frequency resources used, synchronization signal bandwidth, type of synchronization signal, etc.), information received in the broadcast channel, the Master Information Block, and/or the System Information Block identifying whether the network is Release 11 capable or not), the communication uses either a first or a second default transmission mode (e.g., the communication device uses the default transmission mode based on the type of network—tm9 if the network is Release 11 capable; tm1 or 2 if not) to receive data from the network (e.g., the PDSCH).

According to an embodiment, a communication device transmits a message to a network via a random access channel (e.g., msg1 via RACH). In response to the transmission, the communication device receives an identifier (e.g. TC-RNTI). The communication device determines whether the identifier falls into a recognized range. If the identifier falls within the recognized range, responding to the receipt of the identifier with a message indicating that the communication device is capable of monitoring a control channel (e.g., if the identifier falls within a range that the device recognizes as signifying that the network is EPDCCH capable, the device informs the network that it is also EPDCCH capable).

In an embodiment of the invention, the communication device receives a message indicating that the communication device is to cease communicating with the first cell and begin communicating with the second cell (e.g., a handover message). The handover message includes one or more of: time-frequency resources of a control channel of the second cell (e.g., which PRBs that the device is to monitor for the EPDCCH), which antenna ports the device is to use to communicate via the control channel (e.g., which antenna ports does the device use to monitor for the EPDCCH), and energy per resource element information of the second cell (e.g., information that the device can use to determine the EPRE of the REs on which it receives the EPDCCH—e.g., ratio of EPDCCH EPRE to UE-specific RS EPRE within each OFDM symbol containing UE-specific RS, ratio of EPDCCH EPRE to cell-specific RS EPRE among for each OFDM symbol containing an EPDCCH).

The various embodiments disclosed herein are frequently described in the context of an LTE cellular system. It is to be understood, however, that the scope of the invention is not limited to LTE and may be implemented in other types of wireless networks (IEEE 802.11, 802.16, etc.).

The various embodiments disclosed herein are frequently described in the context of an Long Term Evolution (LTE)

cellular system. It is to be understood, however, that the scope of the invention is not limited to LTE and may be implemented in other types of wireless networks (IEEE 802.11, 802.16, etc.).

Prior to proceeding with this disclosure, a couple of preliminary concepts will now be described in accordance with certain embodiments of the invention. A list of acronyms is provided at the end of this disclosure to facilitate reading.

A "channel" according to an embodiment of the invention refers to one or more paths over which to transmit information. This includes a logical channel, a transport channel, and a physical channel. As used herein, "channel" may refer to a logical channel. When describing embodiments of the invention in the LTE context herein, "channel" refers to a transport channel, which is characterized by how data is transferred over the radio interface, including the channel coding scheme, the modulation scheme, antenna mapping, etc. However, when used in conjunction with "physical" in this disclosure, "channel" refers to a physical channel, which, in the LTE context, corresponds to a set of physical resources (e.g. time-frequency and/or resources, etc) that carry information from higher layers. Each physical channel may or may not have a corresponding transport channel. When used in the context of a Channel State Information (CSI) or Channel Quality information (CQI) or channel estimation or multipath fading channel, the term "channel" refers to the wireless propagation channel between the UE and the TP or between the TP and the UE.

An "antenna port" according to an embodiment of the invention may be a logical port that may correspond to a beam (resulting from beamforming) or may correspond to a physical antenna at a UE or a TP. An antenna port may be defined such that a channel over which a symbol on the antenna port is conveyed can be inferred from the effective channel over which another symbol on the same antenna port is conveyed. More generally, an antenna port can correspond to any well-defined description of a transmission from one or more of antennas. As an example, it could include a beamformed transmission from a set of antennas with appropriate antenna weights being applied, where the set of antennas itself could be unknown to a UE. In some particular implementations "antenna port" can also refer to a physical antenna port at the TP. In certain cases, the beamforming or precoding applied at the TP may be transparent to the UE. In other words, the UE need not know what precoding weights are used by the TP for a particular transmission on the downlink. Typically, a transmission associated with an antenna port may include transmission of pilots (or reference signals associated with the antenna port) so that the receiving device can use the pilots to perform channel estimation and equalization and subsequent received signal processing e.g. to recover the transmitted information.

A "layer" in an embodiment of the invention describes the relationship among the various protocols and communication technologies used in, for example, LTE as well as the relationship between those protocols and the physical signaling. While there are many ways to conceptualize these relationships, a common method, which will be used herein, is to refer to three layers: Layer 1, also known as the physical layer; Layer 2, also known as the Media Access Control (MAC) layer; and Layer 3, also known as the Radio Resource Control (RRC) layer. Layers 2 and 3 are often referred to as the "higher layers." Layer 1 refers to those technologies that enable the physical transmission of radio channels, and the raw bits or symbols contained therein. Layer 2, which is generally considered to be split into two sublayers: the MAC layer and the Packet Data Convergence Protocol (PDCP) layer. In general, Layer 2 refers to those technologies that enable functions such as mapping between transparent and logical channels, error correction through Hybrid Automatic Repeat Request (HARQ) priority handling and dynamic scheduling, and logical channel prioritization. Layer 3 handles the main service connection protocols, such as the Non-Access Stratum (NAS) protocol and the RRC protocol. It is to be understood, however, that different conceptualizations of these various technologies is possible, and that the layers may be organized differently.

The previously-mentioned use of the term "layer" is not to be confused with "spatial layer," which refers to spatial multiplexing and the ability of, for example, multiple antennas to multiplex different signals in different geometrical positions and orientations.

A "Radio Network Temporary Identifier" (RNTI) is an identifier used for communication between the between the eNB and the UE. In LTE, there are several types of RNTI, including C-RNTI (Cell RNTI), RA RNTI (Random Access Response RNTI), SI-RNTI (System Information RNTI), SPS C-RNTI (Semi persistent scheduling C-RNTI), Temporary C-RNTI, and Paging RNTI (P-RNTI). Some RNTIs may be UE-specific (i.e. assigned on a UE basis, e.f. C-RNTI, SPS C-RNTI), while some RNTIs are cell-common (e.g. such as P-RNTI, SI-RNTI, etc). Some RNTIs are fixed by specification (e.g. SI-RNTI, etc) and some may be explicitly or implicitly assigned. Each separate physical channel may have its own RNTI. For instance, the cell-specific broadcast PDCCH scheduling the system information and the associated physical data shared channel (PDSCH) use the SI-RNTI. Similarly, UE-specific PDCCH scheduling UE-specific information and the associated physical data shared channel (PDSCH) may use the C-RNTI. Typically the RNTIs are used as part of the scrambling sequence initializations for the associated physical channels and/or as part of the downlink control information message (e.g. CRC masking operations).

An example of a network in which an embodiment of the invention operates will now be described. FIG. 1 illustrates a communication system 100, which includes a network 102. The network 102 includes, TPs 103, 104 and 105 (which may be implemented as eNBs or Remote Radio Heads (RRHs)), and user equipment (UE) or communication device 106, 107 and 108. Various communication devices may exchange data or information through the network 102. The network 102 may be an evolved universal terrestrial radio access (E-UTRA) or other type of telecommunication network. For one embodiment, a TP may be a distributed set of servers in the network 102. In another embodiment, a TP may correspond to a set of geographically collocated or proximal physical antenna elements. A UE may be one of several types of handheld or mobile devices, such as, a mobile phone, a laptop, or a personal digital assistant (PDA). In one embodiment, the UE may be a wireless local area network capable device, a wireless wide area network capable device, or any other wireless device. A TP may have one or more transmitters and one or more receivers. The number of transmitters at a TP may be related, for example, to the number of transmit antennas at the TP. Similarly, a UE may have multiple receive antennas communicating with one or more of the TPs. Each antenna port may carry signals to a UE from a TP and from the TP to the UE. Each antenna port may also receive these signals. In one embodiment, the network 100 is capable of using Coordinated Multipoint (CoMP) techniques.

Figure 2:
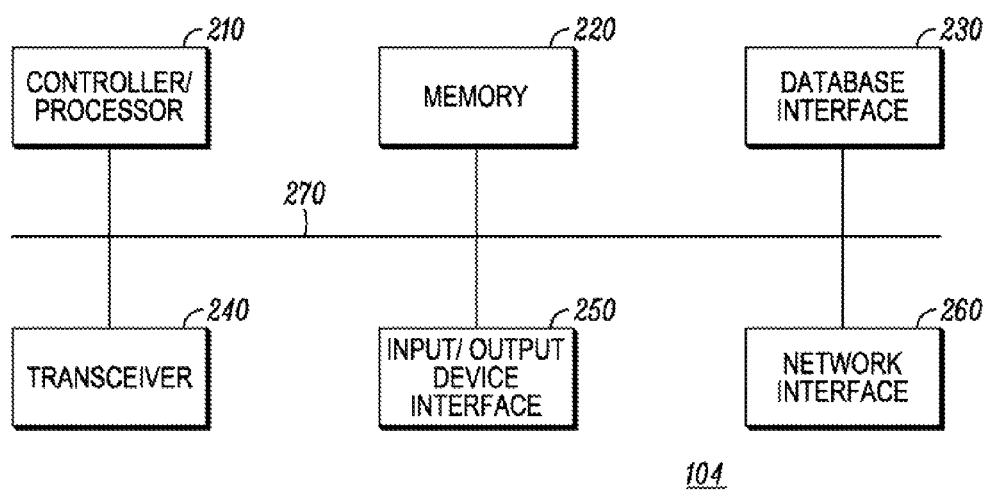
FIG. 2 shows a block diagram depicting certain aspects of a TP in accordance with an embodiment of the invention.

FIG. 2 illustrates a possible configuration of a TP (e.g., one or more of the TPs in FIG. 1). The TP may include a processor/controller 210, a memory 220, a database interface 230, a transceiver 240, input/output (I/O) device interface 250, and a network interface 260, connected through bus 270. The TP may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The processor/processor 210 may be any programmable processor. The subject of the disclosure may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system. Data may be stored in the memory 220 or in a separate database. The database interface 230 may be used by the processor/controller 210 to access the database. The database may contain any formatting data to connect UE to the network 102 (FIG. 1). The transceiver 240 may create a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the TP may be connected via an electrical bus 270, for example, or linked wirelessly.

Client software and databases may be accessed by the processor/processor 210 from memory 220, and may include, for example, database applications, word processing applications, as well as components that embody the decision support functionality of the present disclosure. A TP (FIG. 1) may implement any operating system, such as Microsoft Windows®, LINUX, or UNIX, for example. Client and server software may be written in any programming language, such as C, C++, Java or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Other embodiments may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
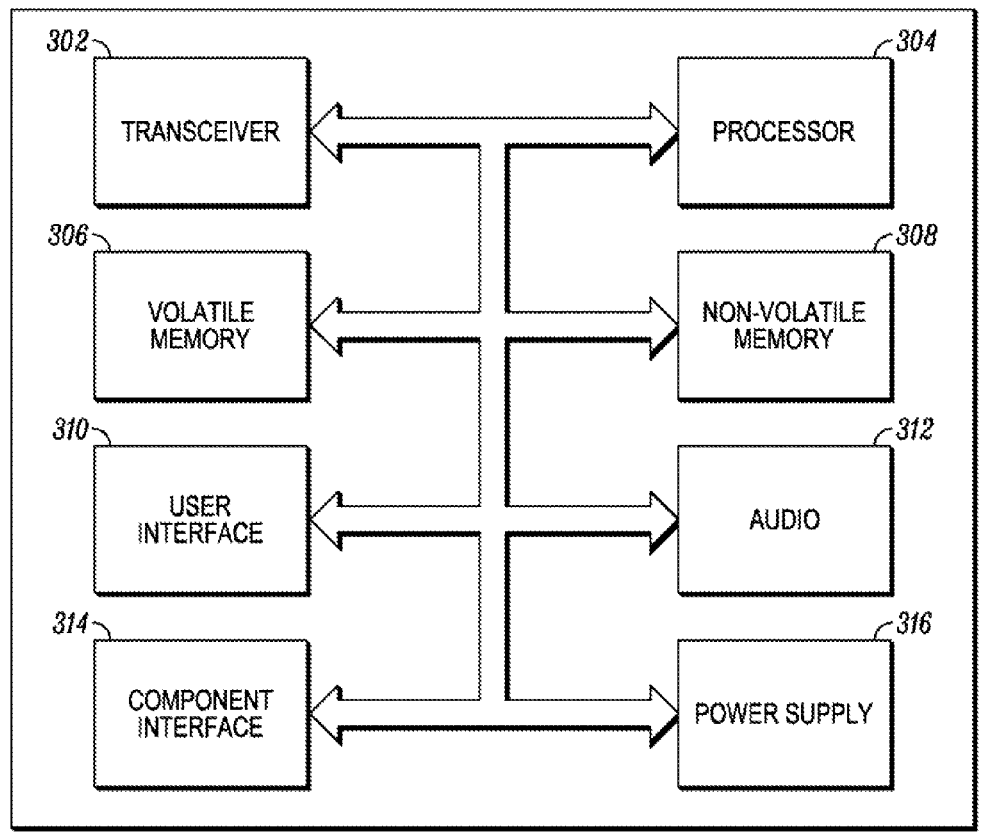
FIG. 3 shows a block diagram depicting aspects of a device that that may function as a UE in an embodiment of the invention.

FIG. 3 illustrates in a block diagram one embodiment of a telecommunication apparatus or electronic device to act as a UE (such as one or more of the UEs depicted in FIG. 1). The UE may be capable of accessing the information or data stored in the network 102. For some embodiments of the disclosure, the UE may also support one or more applications for performing various communications with the network 102.

The UE may include a transceiver 302, which is capable of sending and receiving data over the network 102. The UE may include a processor 304 that executes stored programs. The UE may also include a volatile memory 306 and a nonvolatile memory 308 which are used by the processor 304. The UE may include a user input interface 310 that may comprise elements such as a keypad, display, touch screen, and the like. The UE may also include a user output device that may comprise a display screen and an audio interface 312 that may comprise elements such as a microphone, earphone, and speaker. The UE also may include a component interface 314 to which additional elements may be attached, for example, a universal serial bus (USB) interface. Finally, the UE may include a power supply 316.

Figure 4A:
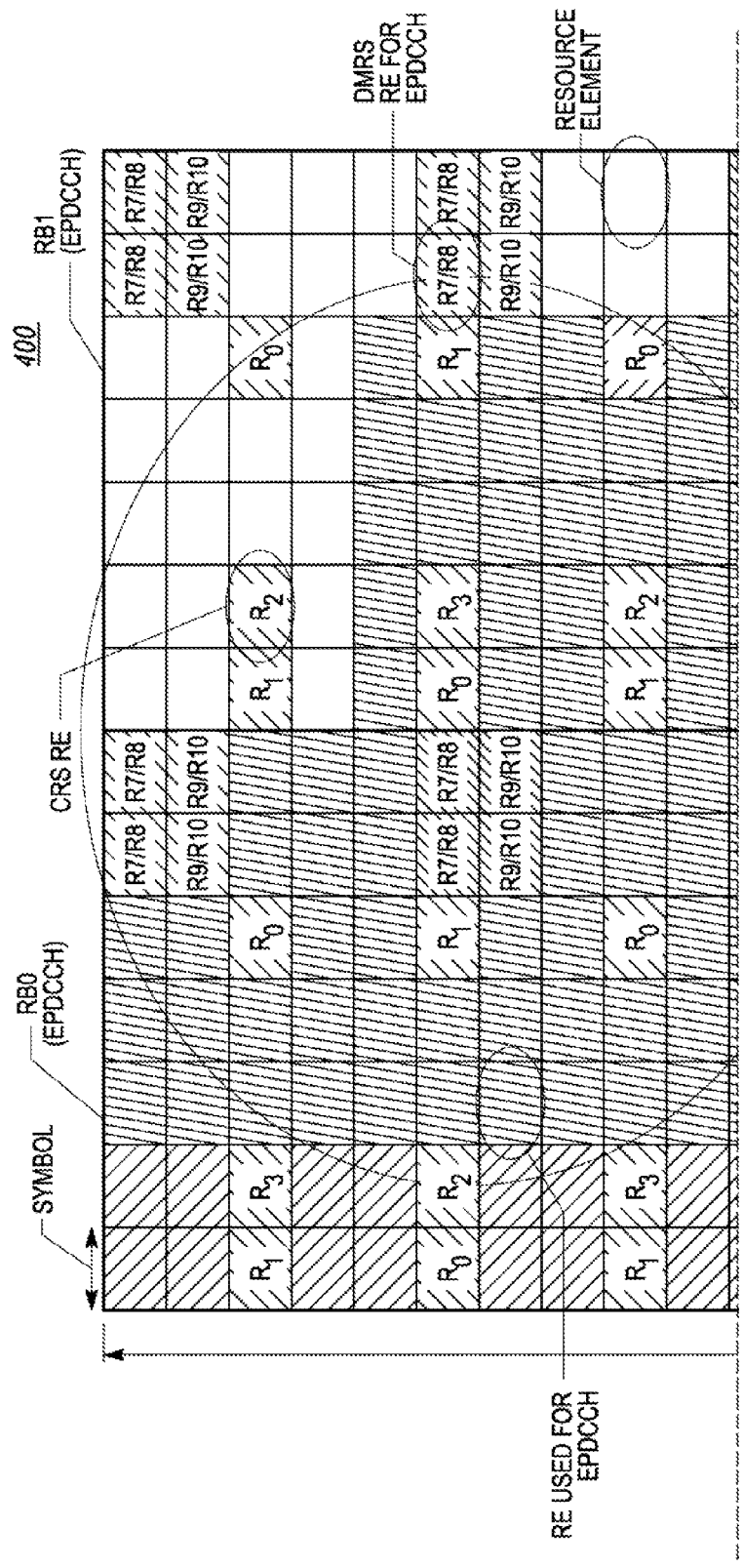
FIG. 4 depicts a sub-frame according to an embodiment of the invention.
Figure 4B:
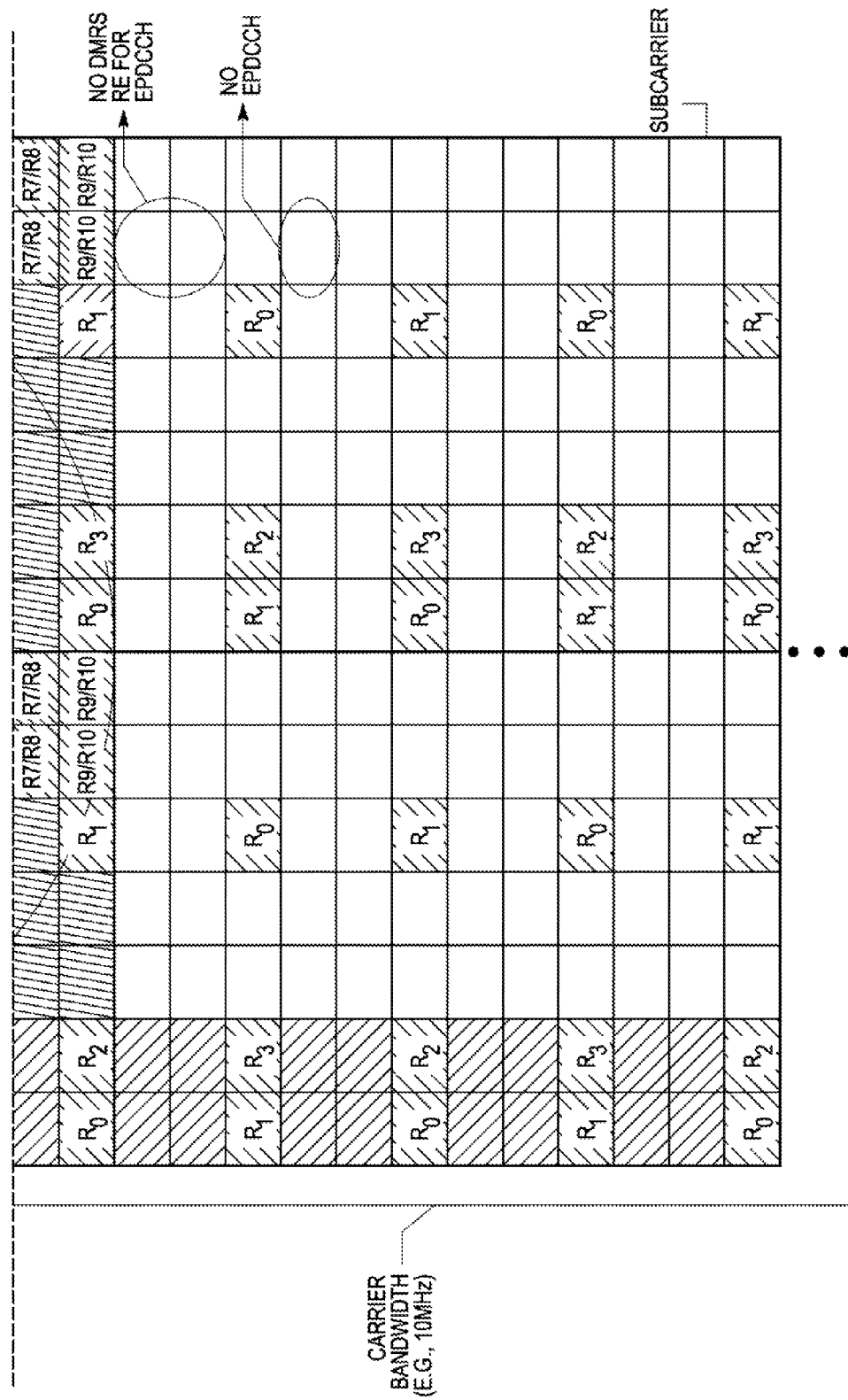
Figure 4C:
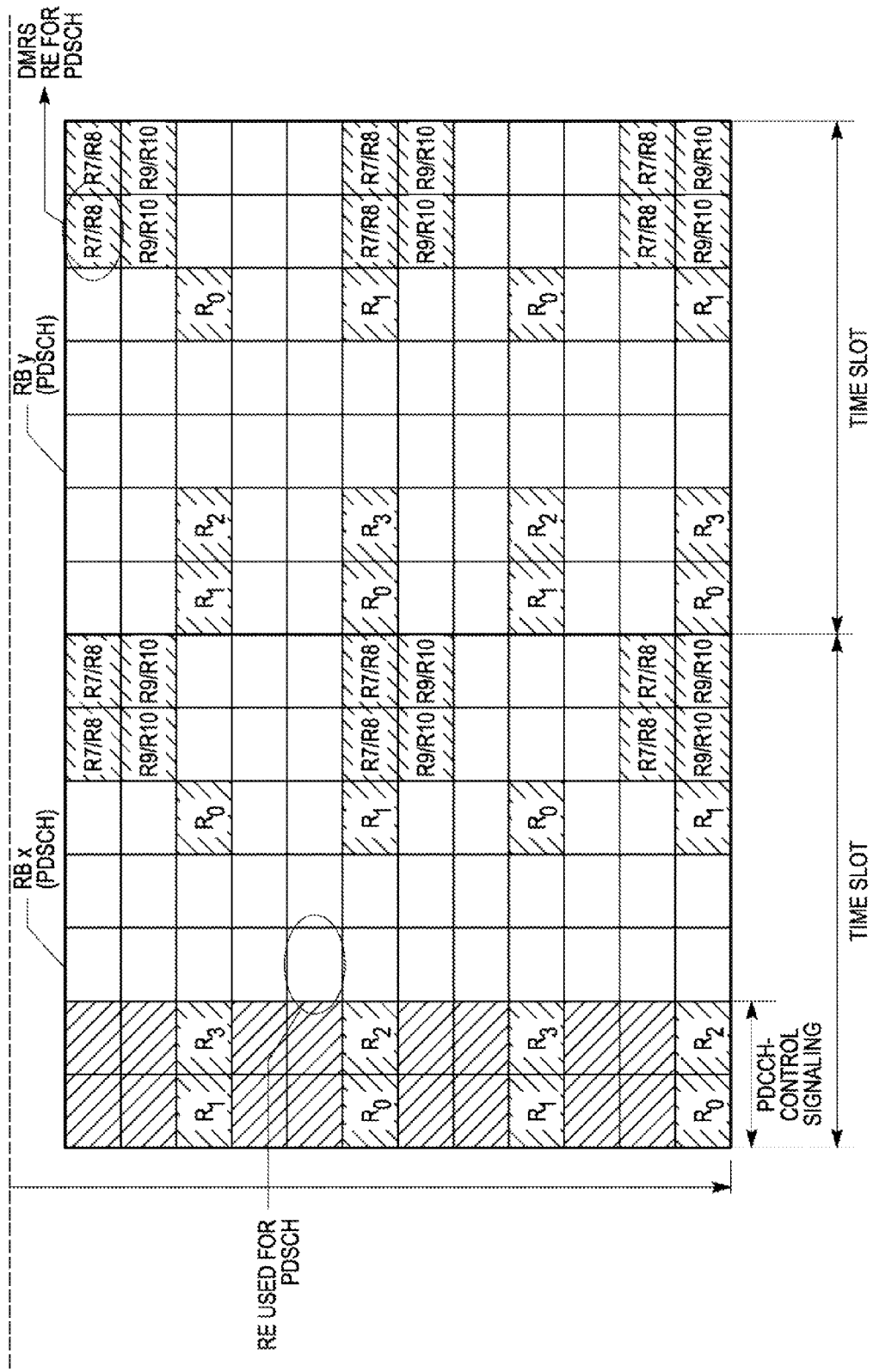

It is to be noted that various embodiments of the inventive methods described herein may be carried out on the hardware described with reference to FIG. 3 or FIG. 4, or in some cases both. It is to be understood that there may be many other components of a UE, TP, network, or communication system that are known in the art but not depicted in this disclosure, but that would be used in conjunction with the embodiments described in this disclosure.

Referring back to FIG. 1, one or more of the TPs and one or more the UEs may include one or more transmitters and one or more receivers. The number of transmitters may be related, for example, to the number of transmit antennas at the TP and UE. The TP and the UE may also have multiple antennas. A multiple antenna configuration on either a TP or a UE is generally supports MIMO communication.

Referring again to FIG. 1, the general mode of communication of the system 100 according to an embodiment of the invention will now be described. Although the communication will often be referred to as taking place between the network 102 and a UE 106, it is to be understood that this is for ease of description, and that the communication takes place between one or more of the TPs of the network 102 and the UE 106.

The network 102 and the UE 106 generally communicate via physical UL channels and physical DL channels. The physical medium used for the communication is Radio Frequency (RF) signals. The RF signals are transmitted on a carrier frequency with a predefined channel bandwidth. The modulation scheme used for communication between the network 102 and the UE 106 differs depending on whether the signals are being sent in the UL direction (travelling from the UE 106 to network 102) or the DL direction (travelling from the network 102 to the UE 106). The modulation scheme used in the DL direction is a multiple-access version of OFDM called Orthogonal Frequency-Division Multiple Access (OFDMA). In the UL direction, Single Carrier Frequency Division Multiple Access (SC-FDMA) is used.

According to an embodiment of the invention, orthogonal subcarriers transmitted in the DL direction are modulated with a digital stream, which may include data, control information, or other information, so as to form a set of OFDM symbols. The subcarriers may be contiguous or discontiguous. DL data modulation may be performed using quadrature phase shift-keying (QPSK), 16-ary quadrature amplitude modulation (16QAM), or 64QAM, although other modulation schemes may be used. The OFDM symbols are configured into a DL sub-frame. Each OFDM symbol has a time duration and is associated with a cyclic prefix (CP). A CP is similar to a guard period between successive OFDM symbols in a sub-frame, but its primary function is to render the data transmitted on different subcarriers orthogonal upon application of a Fast Fourier Transform (FFT) in a receiver in a multipath fading channel.

The DL data carried by the OFDM signals is organized into radio frames. Each radio frame typically includes ten sub-frames. An example of the structure of a sub-frame is shown in FIG. 4, which depicts a sub-frame 400 represented as a time-frequency diagram. A vertical scale of the diagram depicts multiple blocks of frequency, also referred to as frequency bins or frequency subcarriers. A horizontal scale of the diagram depicts multiple blocks of time (in units of OFDM symbols) of the sub-frame 400 that may be allocated. The sub-frame 400 comprises multiple resource blocks (RBs) such as Resource Block 0 (RB0), Resource Block 1 (RB1), Resource Block 2 (RB2), and Resource Block 3 (RB3). Typically, each RB comprises 12 OFDM subcarriers over a time slot comprising 7 OFDM symbols. Typically, the sub-frame duration is 1 ms and is organized into two time slots of 0.5 ms duration each. Each RB can be divided into multiple resource elements (REs). Each RE is a single OFDM subcarrier, or frequency bin, on a single OFDM symbol. It is to be noted that many frames and sub-frames may be transmitted from the network 104 to the UE 106 and vice-versa, and that various channels may occupy slots in many sub-frames.

The sub-frame 400 may also be used to carry other signals and channels such as synchronization signals such as Primary/Secondary Synchronization channels (P/S-SCH), broadcast control channels, including primary broadcast control channel (PBCH), etc. The PBCH includes the MIB. The MIB includes a portion of a system frame number (SFN), downlink system bandwidth, Physical Hybrid ARQ Channel (PHICH) configuration (such as duration and PHICH resource indicator), PDCCH and EPDCCH related (e.g., indication) configuration information (described in more detail elsewhere).

To enable DL communication to occur smoothly, the network 102 uses control signaling, including DL signaling via DL control channels. One such DL control channel is the Physical Downlink Common Control Channel (PDCCH) which is located at the start of each DL sub-frame (up to the first three OFDM symbols). Another is the Enhanced Physical Downlink Control Channel (EPDCCH) which is located on one or more RB-pairs spanning both slots in the sub-frame. Each of these channels carries the DL scheduling assignment, UL scheduling grants, UL transmit power control commands, etc. In one embodiment, EPDCCH is used in LTE Release 11, and is an enhanced version of the PDCCH, which is used in LTE Releases 8, 9, and 10.

Each of the PDCCH and EPDCCH carries Downlink Control Information (DCI). DCI provides the UE with information necessary for proper reception and decoding of downlink data. DCI may include DL information such as scheduling assignments, including PDSCH resource indication, transport format, hybrid ARQ information, and spatial multiplexing control information. DCI may also include UL scheduling grants and UL information of the same types as the DL information.

The network 102 (FIG. 1) transmits the PDCCH to the UE 106 in a set of RBs that span the entire frequency range of the sub-frame 400. In contrast, the EPDCCH may be transmitted over only a portion of the frequency range. In the sub-frame 400 of FIG. 4, for example, the UE 106 receives the EPDCCH in RB0 and RB1, i.e., RB-pairs spanning both slots of the sub-frame, but only part of its frequency range.

Another example of a downlink channel that can be carried in the sub-frame 400 is the physical downlink shared channel (PDSCH). The PDSCH is used to send user data and control information (such as paging messages) to all mobile devices operating within its coverage area.

To decode information carried on the PDCCH in an embodiment of the invention, the UE carries out channel estimation. To perform channel estimation, UE uses Reference Signals (RS) or pilot symbols that it receives in the sub-frame 400. The reference signals are associated with one or more antenna ports. For example, a UE using LTE Release 8, 9, or 10 uses the reference signals associated with one or more of antenna ports 0, 1, 2, and 3. The RS structure for antenna ports 0, 1, 2, and 3 is shown in FIG. 4, in which R0, R1, R2, R3 are resource elements carrying reference signals associated with antenna ports 0, 1, 2, and 3 respectively.

To decode data carried on the PDSCH in an embodiment of the invention, the UE 106 may use RS received in the sub-frame 400. For example, a UE using LTE Release 10 the UE can either use reference symbols associated with one or more of antenna ports 0, 1, 2, or 3, or use reference symbols associated with one or more of antenna ports 7, 8, 9, 10, 11, 12, 13, 14. The selection of antenna ports to be used is based on the transmission mode used for PDSCH reception. The concept of a "transmission mode" is described in more detail elsewhere. A reference signal associated with antenna ports 7-14 are typically referred to as a "UE specific reference signal (UERS)" or "Demodulation reference signal (DMRS)." A reference signal associated with antenna ports 0, 1, 2, 3 is typically referred to as "Cell-specific Reference Signal (CRS)." While a CRS is sent across the entire carrier bandwidth by the TP, the DMRS may only be present in those RBs for which the UE has a PDSCH assignment.

Another type of reference signal that may be included in the sub-frame 400 is a Channel State Information Reference Signal (CSI-RS). The CSI-RS is used by the UE to determine channel-state information (CSI) that the UE reports to the network 102. In one embodiment, the CSI includes a Channel Quality Indicator (CQI). The CQI gives the network 102 information about the link adaptation parameters that the UE can support at that time, taking into account the transmission mode, the receiver type of the UE, the number of antennas being used by the UE, and the interference being experienced by the UE. In one embodiment, the CQI is defined by a sixteen entry table with Modulation and Coding Schemes (MCS).

In an embodiment of the invention, a PDCCH is transmitted on one or an aggregation of consecutive Control Channel Elements (CCEs). In a PDCCH, a CCE has 9 Resource Element Groups (REGs), with each REG containing 4 Resource Elements (REs), for a total of 36 REs.

In an embodiment of the invention, an EPDCCH is transmitted on one or an aggregation of enhanced control channel elements (eCCEs). An eCCE can correspond to a set of REs in a set of resource blocks on which EPDCCH is transmitted. The set of REs that correspond to an eCCE may be further grouped into enhanced resource element groups (eREGs).

The size of an eCCE may not be fixed, and may correspond to different number of REs in different subframes.

In an embodiment of the invention, each instance of a PDCCH or EPDCCH has its own configuration. The configuration of a PDCCH or EPDCCH is indicated by a PDCCH or EPDCCH configuration message respectively. A "configuration" in this context is described by a set of "attributes." Possible attributes of a PDCCH or EPDCCH include: CCE size (or eCCE size), CCE aggregation level (or eCCE aggregation level), localized transmission of the CCEs (or eCCEs), distributed transmission of the CCEs (or eCCEs), its transmission scheme, its SNR gain, the set of RBs in which it is contained, the antenna ports it uses, the number of antenna ports it uses, the number of spatial layers it uses, the scrambling sequence for its (EPDCCH or PDCCH) coded bits, initialization or portion of the initialization or parameters for computing the initialization of the scrambling sequence generator for the scrambling sequence for PDCCH or EPDCCH coded bits, UERS or DMRS sequence or DMRS scrambling sequence, initialization or portion of the initialization parameters for computing the initialization (e.g, DMRS scrambling sequence identifier) of the scrambling sequence generator for DMRS sequence, DMRS signature sequence (sequence used to modulate the DMRS sequence), its modulation, and the PDCCH or EPDCCH to reference signal (e.g., DMRS) power boost ratio, which is determined, for example, from the ratio of the Energy Per Resource Element (EPRE) of the PDCCH or EPDCCH to that of the reference signal (e.g., DMRS).

An example of two EPDCCHs having configurations that differ in one or more attributes is as follows: EPDCCH configuration #1 has 4 eCCEs, DMRS port #7, RBs {#5, #20, #35, #45}, 0 dB power boost. EPDCCH configuration #2 has 8 eCCEs, DMRS port #7, RBs {#5, #20, #35, #45}, 3 dB power boost. Thus, the two configurations differ in 2 attributes: # of eCCEs and power boost.

To receive the PDCCH or the EPDCCH in accordance with an embodiment of the invention, a UE monitors a set of PDCCH or EPDCCH candidates (e.g., candidate RBs). In this context, "monitoring" refers to the UE attempting to decode each of the candidates in the PDCCH or EPDCCH candidate set according to all applicable DCI formats for that candidate. The set of EPDCCH or PDCCH candidates to be monitored by UE, that is, the EPDCCH or PDCCH candidate set, can also be defined in terms of search spaces. The EPDCCH or PDCCH candidates that UE monitors may include a set of Common Search Space (CSS) candidates, and a set of UE Specific Search Space (UESS) candidates. The UESS corresponding to EPDCCH may optionally be called an enhanced UESS (eUESS). CSS candidates are monitored by all UEs in a cell, while UESS candidates are specific to individual UEs and are monitored by the UEs for which they are intended.

When monitoring the CSS, a UE starts decoding from a CCE or eCCE with known logical index (e.g. CCE0). This restriction further simplifies the common search. The UE attempts to decode every possible PDCCH or EPDCCH candidate set for given PDCCH or EPDCCH format until it successfully decodes the PDCCH or EPDCCH that is present in the CSS.

To optimize the searching process in an embodiment of the invention, CCEs (eCCEs) may be aggregated into groups, or "aggregations," which are searched together. The sizes of the aggregations (i.e., how many CCEs or eCCEs are therein) are classified into "aggregation levels." For example, an search space $S_k^{(L)}$ at aggregation level L can refer to a set of candidates in which each candidate in the search space has L aggregated CCEs (or eCCEs). A PDCCH may have aggregations of 1, 2, 4, and 8 CCEs, with each CCE including 36 REs.

An EPDCCH may also have aggregations of 1, 2, 4, and 8 CCEs (or eCCEs). However, since the size of the CCEs (or eCCEs) of an EPDCCH is not fixed, other aggregation levels (e.g. L=3 or L=12) may be used. Also, since the size of the EPDCCH CCEs (or eCCEs) can change considerably between different sub-frames and slots within a sub-frame (for example, based on control region size, presence of CSI-RS, and sub-frame type), a set of aggregation levels that the UE 106 assumes for EPDCCH monitoring also may vary between sub-frames or between slots in a same sub-frame or between different sub-frame types (for example, a normal sub-frame vs. an MBSFN sub-frame). More generally, a set of aggregation levels that the UE assumes for EPDCCH monitoring can vary between over time.

An example of how the TP 104 (FIG. 1) creates and transmits a UE-specific EPDCCH or PDCCH and how the UE 106 extracts the EPDCCH or PDCCH intended for the UE 106 will now be described with reference to FIGS. 1 and 4, and to FIG. 5. For the sake of simplicity, this example will be described in the context of EPDCCH, though it is to be understood that the process may be the same for a PDCCH.

Figure 5:
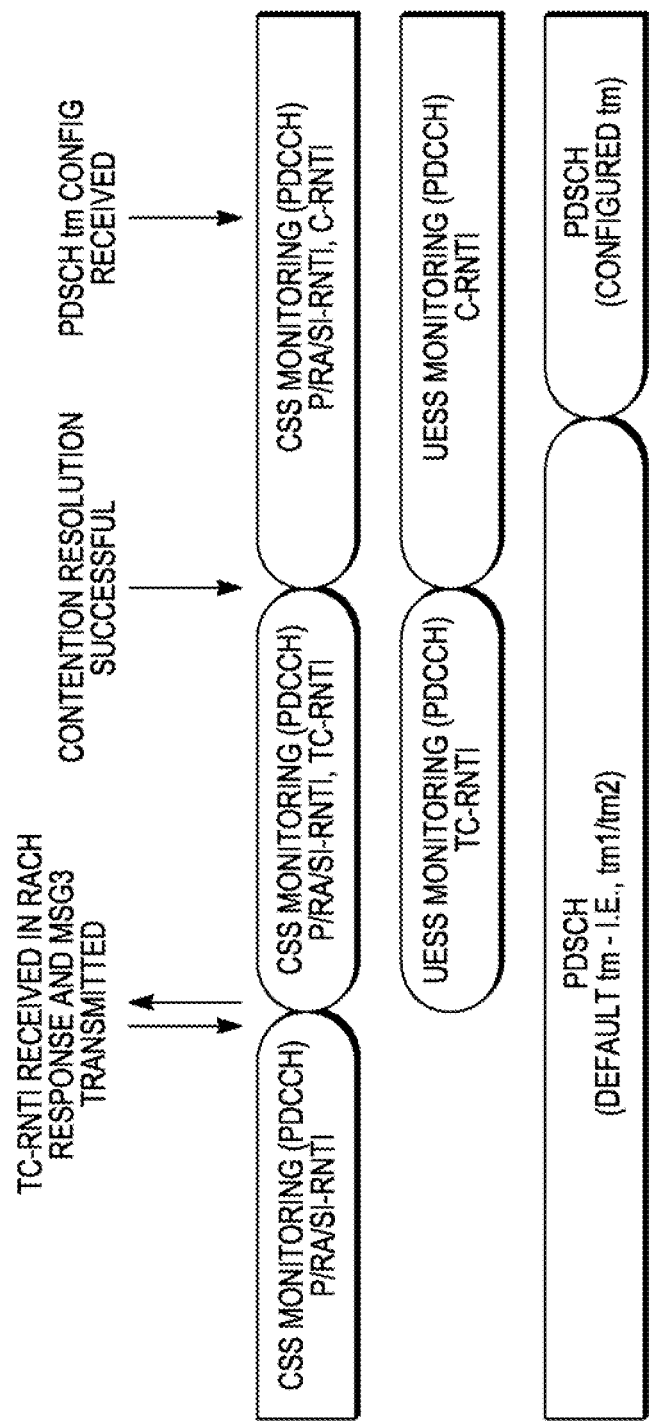
FIG. 5 shows an example of how the TP of FIG. 1 creates and transmits a UE-specific control channel in an embodiment of the invention.

Preliminarily, the UE 106 performs a random access to the network 102 using a Random Access Channel (RACH) (FIG. 5). In doing so, the UE 106 transmits a RACH preamble sequence, referred to as msg1, to the TP 104. The UE 106 receives a RACH response, referred to here as msg2, from the TP 106. The msg2 contains an identifier called a Temporary C-RNTI (TC-RNTI). The UE 106 transmits a msg3 to the network 102, which identifies the UE 106 to the network 102. Specifically, the UE 106 uses a pre-existing C-RNTI or another pre-existing identifier to identify itself. If the UE 106 has been previously identified to the network 102, then the UE 106 already has a C-RNTI, and uses that C-RNTI to identify itself. Otherwise, the UE 106 uses another pre-existing identifier such as S-TMSI (S-Temporary Mobile Subscriber Identity). After transmitting msg3, the UE 106 uses the TC-RNTI (or C-RNTI) to monitor the PDCCH for uplink grants and downlink assignments. Once the UE receives a message indicating successful contention resolution—a msg4—it promotes its TC-RNTI to a C-RNTI if it does not already have a C-RNTI. The UE then continues monitoring the UESS using the C-RNTI.

Once the TP 104 and UE 106 have completed the RACH process, the TP 104 creates an EPDCCH message. To do so, the TP 104 determines the appropriate EPDCCH format, creates the appropriate DCI and attaches a CRC. The CRC is then masked with an RNTI. Which RNTI is used depends of the purpose for with the EPDCCH is to be used. If, for example, the EPDCCH is for a specific UE, the CRC will be masked with the C-RNTI of the specific UE. Other RNTIs may be used in other scenarios.

To obtain the control information from the EPDCCH, the UE 106 carries out blind decoding. In other words, the UE 106 monitors a set of EPDCCH candidates (a set of consecutive CCEs (or eCCEs) on which EPDCCH could be mapped) in every sub-frame. The UE 106 de-masks each EPDCCH candidate's CRC using the C-RNTI. If no CRC error is detected, the UE 106 considers it as a successful decoding attempt and reads the control information within the successful EPDCCH candidate.

It is to be noted that there are possible variations on the above procedure. For example, if the EPDCCH contains paging information, the CRC may be masked with a paging indication identifier, i.e., P-RNTI. If the EPDCCH contains system information, a system information identifier, i.e., a SI-RNTI, may be used to mask the CRC.

In accordance with an embodiment of the invention, in order to receive the PDSCH, a UE may be configured with a transmission mode from among multiple known transmission modes. During initial access to the network, that is, before receiving transmission mode configuration signaling from the network 102, the UE 106 can receive the PDSCH by assuming a default value for transmission mode. In LTE Releases 8, 9, and 10, the default values for transmission mode are tm1 for a one CRS antenna port system and tm2 for a two CRS antenna port system. In LTE Release 11, the default value for transmission mode is tm9. The network 102 can subsequently configure the UE with other non-default values for transmission modes to receive PDSCH. The aspect of UE receiving PDSCH using a default value for transmission mode is also referred to as receiving PDSCH using a "default transmission mode".

According to various embodiments, each transmission mode has certain attributes. For example, if the UE is configured with transmission mode 2, the UE can receive the PDSCH using CRS and a transmit diversity transmission scheme. If the UE is configured with transmission modes 3, 4, 5, or 6, the UE can receive the PDSCH using CRS and Multiple Input Multiple Output (MIMO) based transmission schemes such as open loop spatial multiplexing, closed loop spatial multiplexing and Multi-User MIMO (MU-MIMO). If the UE is configured with transmission modes 7 or 8, the UE can receive the PDSCH using UE-specific RSs. If the UE is configured with transmission mode 9, the UE can receive the PDSCH using DMRS, and spatial multiplexing of up to eight spatial layers is possible. Transmission mode 9 is suitable for PDSCH reception using features such as CoMP and MIMO techniques such as MU-MIMO. Configuring the UE in transmission mode 9 also allows for beamformed frequency-selective transmission of the PDSCH to the UE.

In an embodiment of the invention, in order to provide the required data bandwidth, several carriers may be used together in a process called carrier aggregation (CA). Using this processes several carriers are aggregated on the physical layer to provide the required bandwidth. To an a UE that is not capable of using CA terminal, each component carrier appears as a separate carrier, while a UE that is CA-capable can exploit the total aggregated bandwidth of the multiple carriers as if they were a single carrier.

When carrier aggregation is employed, at least one of the TPs acts as the "primary cell" or Pcell, and the other TPs act as secondary cells or Scells. The Pcell is often referred to as the "anchor cell," and its carrier is often referred to as the "anchor carrier". The Pcell is the cell that operates on the primary frequency, to which the UE (1) performs an initial connection establishment procedure, (2) initiates the connection re-establishment procedure, or (3) is indicated as the primary cell in a handover procedure. The Scell, on the other hand, is a cell that operates on a secondary frequency, which may be configured once an RRC connection is established.

In an embodiment of the invention a type of Scell is New Carrier Type (NCT). An NCT does not transmit one or more of a CRS, a PSS, an SSS, or paging signals.

According to an embodiment of the invention, one or more of the UEs may employ the technique of Discontinuous Reception (DRX). This technique allows a terminal to put its frequency modem into a sleep state for long periods, activating it only in well defined, suitable, instants. This keeps the terminal from having to continuously monitor control channels.

EPDCCH UESS Monitoring

Figure 6:
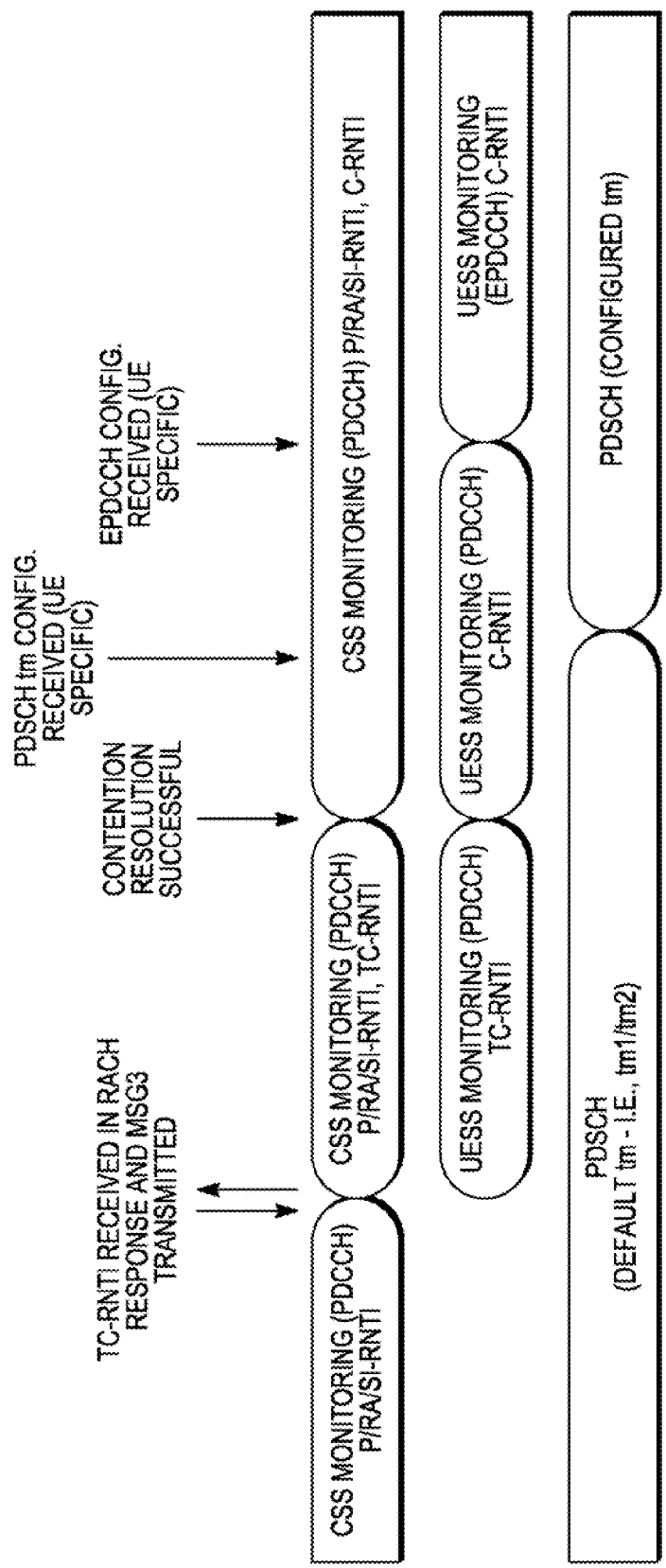

Referring to FIG. 6, one scheme for EPDCCH based UESS monitoring will now be described. In this embodiment, the network configures the UE to monitor for the EPDCCH by transmitting EPDCCH configuration information to the UE via the PDCCH. For example, the UE may monitor the UESS for the PDCCH. The UE eventually identifies and successfully decodes the PDCCH meant for it. Over the PDCCH, the network sends, for example, DL assignments scrambled via TC-RNTI to the UE. The network may also use the PDCCH to send higher layer (MAC/RRC) messages to the UE, such as messages requesting UE capability, messages that indicate the RBs/RB pairs on which the UE is to monitor for the UESS-based EPDCCH (i.e., EPDCCH based UESS candidates or eUESS candidates), and messages that configure the UE to monitor for the UESS-based EPDCCH.

In an embodiment of the invention, the network may also change the transmission mode of the UE from one transmission mode to another using the same RRC message that the network uses to configure the UE to monitor for the UESS-based EPDCCH. For example, in LTE, EPDCCH and PDSCH both use a DMRS-based transmission mode. In some implementations of LTE, transmission mode 9 allows both PDSCH and EPDCCH to be received at the same time using different DMRS antenna ports. The network could send a message to the UE to configure it to use transmission mode 9 and a message that configures the UE to monitor for the EPDCCH in a single RRC message In a more specific example, if the network supports both Release 8/9/10 UEs and Release 11 UEs, the network can reuse the same initial setup signaling for both types of UEs. After the network receives UE capability/category information from the UEs, the network can individually configure Release 11 UEs for EPDDCH UESS monitoring.

In some embodiments, the network 102 does not know whether a UE 106 is EPDCCH-capable (e.g., whether the UE is a Release 11 UE). In one implementation, the UE 106 first determines a 'default' EPDCCH configuration. The UE then informs the network that it is EPDCCH-capable during a RACH procedure as follows: The UE transmits a RACH preamble sequence (msg1) to the network. In response, it receives a RACH response (msg2) and the RACH response contains TC-RNTI. The UE uses the TC-RNTI (or C-RNTI, as explained elsewhere) to identify itself in its subsequent UL transmissions (and to scramble its UL transmissions). The UE transmits what will be referred to as 'new msg3' to the network. The new msg3 includes a unique identifier that is associated with the UE (e.g. a TMSI). The new msg3 also includes bits or information that indicate to the network that the UE is capable of supporting EPDCCH reception.

Some possible bits that the UE may use to inform the network that the UE is EPDCCH-capable are as follows: (1) The UE can use bit(s) in a "criticalExtensionsFuture" field in a "RRCConnectionRequest" message of the new msg3 to indicate to the network that it is capable of supporting EPDCCH reception. (2) The UE can use a spare bit in a "RRCConnectionRequest-r8-IEs" information element in a "RRCConnectionRequest" message of the new msg3 to indicate to the network that it is capable of supporting EPDCCH reception. (3) The UE can use spare bit(s) in a "EstablishmentCause" information element in a "RRCConnectionRequest" message of the new msg3 to indicate to the network that it is capable of supporting EPDCCH reception.

It should be noted that the embodiments described previously may vary with respect to the order in which functions are carried out and which actions are "cause" and which are "effect." For example, when a UE transmits a preamble sequence as part of a RACH procedure, the TP receiving the preamble may be an Scell, while the UL grant may be transmitted to the UE by the Pcell. Thus, the "response" to the preamble sequency may be made by a TP other than the "recipient" of the preamble sequence.

After transmitting the new msg3, the UE starts monitoring EPDCCH using the default EPDCCH configuration. By virtue of the information in the new msg3, the network now knows that the UE is EPDCCH-capable and therefore can begin to send UE-specific EPDCCH control signals using the default EPDCCH configuration.

The default EPDCCH configuration can include information identifying a set of PRB-pairs (Physical resource block pairs) on which the UE monitors EPDCCH. The set of PRB-pairs is usually smaller than the transmission bandwidth configuration of the carrier on which EPDCCH is monitored. For example, if the transmission bandwidth configuration of a carrier is 100 RBs (this corresponds to 20 MHz carrier or channel bandwidth, each RB can logically correspond to a PRB-pair), the default EPDCCH configuration can include information identifying a set of 4 RB-pairs within the 100 RBs. The default EPDCCH configuration can also include information identifying a set of antenna ports based on which the UE can receive EPDCCH. The default EPDCCH configuration can also include information using which the UE can determine the EPRE (energy per resource element) of the REs (resource elements) on which it receives EPDCCH.

The default EPDCCH configuration is determined by the UE based on a signal from the network. The signal from the network can include one or multiple bits of information transmitted by a TP in the network. The bits may be transmitted as part of the MIB or one of the SIBs. SIBs are received by the UE on PDSCH RBs assigned via CSS PDCCHs whose CRC is scrambled with SI-RNTI. In one implementation, the signal from the network is a message (included in MIB or SIBs) that explicitly indicates the default EPDCCH configuration to the UE. In another implementation, the UE may implicitly determine the default EPDCCH configuration using a signal from the network. For example the UE may determine the default EPDCCH configuration using a cell identifier (or a transmission point ID) of an eNB (or a transmission point) in the network. For example, the UE may use network signals such as PSS (Primary synchronization signal), SSS (secondary synchronization signal), CRS (cell-specific reference signal) or CSI-RS (CSI reference signal or Channel state information reference signal) to determine an identifier associated with an eNB or a transmission point of the network. For example, the identifier can be a PCID (Physical cell identifier) or a TP-ID (transmission point identifier). The UE can then use the identifier to implicitly determine the default EPDCCH configuration to receive EPDCCH.

The default EPDCCH configuration can correspond to a set of PRB pairs on which the UE monitors EPDCCH candidates that are transmitted using a distributed mapping format. When EPDCCH is transmitted using distributed mapping, each CCE (or eCCE) of the monitored EPDCCH candidate is mapped to more than on PRB-pair.

After the UE starts monitoring UESS-based EPDCCH candidates using the default EPDCCH configuration, it may receive higher layer signaling configuring it to monitor EPDCCH candidates using an additional EPDCCH configuration. After receiving such signaling, the UE may monitor EPDCCH candidates based on both the default EPDCCH configuration and the additional EPDCCH configuration. The additional EPDCCH configuration can be signaled to the UE using RRC signaling in a dedicated RRC message (e.g. a "RRCConnectionReconfiguration" message that includes a "radioResourceConfigDedicated" field). The additional EPDCCH configuration can include information identifying additional sets of PRB-pairs and antenna ports to monitor EPDCCH. The sets of PRB-pairs identified in the default EPDCCH configuration and the additional EPDCCH configuration can overlap.

For receiving PDSCH, an EPDCCH-capable UE can use the same CRS-based transmission mode as non-EPDCCH capable UEs. For example, a Release 11 UE can use the same CRS-based default transmission modes that Release 8, 9, and 10 UEs use for receiving SIBs and RACH responses (i.e., tm1 for the 1 CRS antenna port case and tm2 for the 2 CRS antenna port case). However, after transmitting the new msg3 the UE can receive PDSCH using a new default transmission mode that allows it to receive PDSCH using DMRS (e.g. tm9). This is because when the network receives the new msg3, it will know the UE is EPDCCH capable (e.g., is a Release 11 UE), and can begin sending the PDSCH to the UE using tm9.

Figure 7:
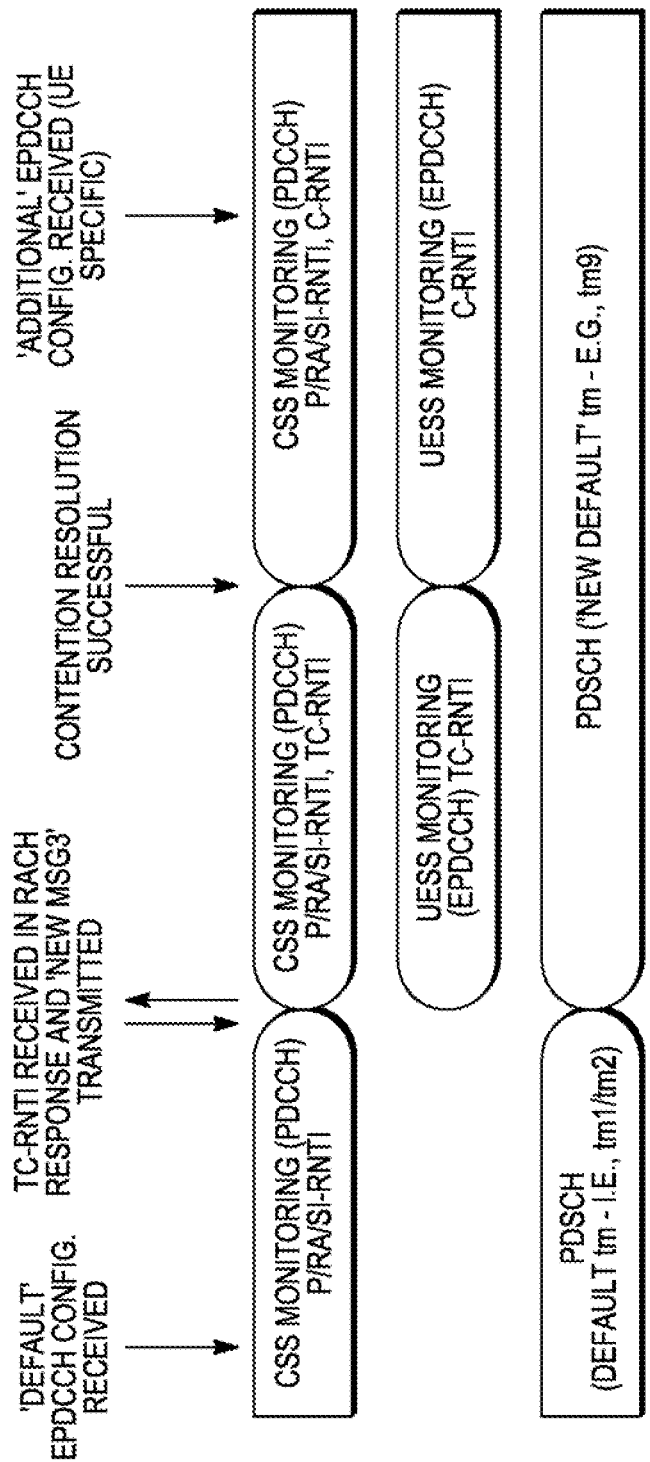

FIG. 7 shows an example implementation of these features. As shown, the UE monitors CSS using PDCCH. The UE also receives a default EPDCCH configuration from the network using one of the above-described methods. After transmitting the new msg3 the UE starts monitoring EPDCCH UESS using the default EPDCCH configuration. Similarly, after receiving the msg3, the network sends UESS-based EPDCCH information to the UE. If the UE is not configured with a C-RNTI, the UE initially monitors EPDCCH UESS using a Temporary C-RNTI (TC-RNTI) and after contention resolution is successful, it promotes the TC-RNTI to a C-RNTI and monitors EPDCCH UESS using C-RNTI. Also, the UE can receive additional EPDCCH configuration from higher layers (e.g. RRC) to monitor additional EPDCCH UESS candidates using C-RNTI.

According to another embodiment, the eNB may not always be able to schedule using EPDCCH in response to the new msg3. For example, (a) the eNB may want to use a different EPDCCH configuration than the default configuration, (b) the eNB may not want to use EPDCCH for this particular UE (e.g., it may be a delay tolerant "Machine type" UE (typically engaged in Machine Type Communications) and the eNB prefers to use EPDCCH capacity for conventional UEs), or (c) the eNB may not have enough EPDCCH capacity. In such cases, the eNB would need to schedule the UE using PDCCH. In order to enable this, the UE can be configured to monitor for both PDCCH and EPDCCH after transmitting msg3. If the first transmission from the eNB to the UE is via EPDCCH, the UE switches to an EPDCCH-only mode; if the first transmission from the eNB to the UE is via PDCCH, the UE switches to a PDCCH only mode. During the period when the UE is monitoring both EPDCCH and PDCCH candidates, the UE's blind decodes are split between PDCCH and EPDCCH (i.e., not all aggregation levels can be used for either PDCCH or EPDCCH). Once the UE switches to EPDCCH-only mode or PDCCH-only mode, all the blind decodes can be used towards EPDCCH or PDCCH respectively.

In some implementations, the UE receives a signal from the network, based on the received signal, can determine which transmission mode to use to receive the PDSCH. If the nature and content of the signal indicate that the network is not an EPDCCH-capable network, then the UE may choose to receive PDSCH using a first default transmission mode (i.e., receive PDSCH using a first default value for transmission mode). If the signal indicates that the network is not an EPDCCH-capable network, then the UE may choose to receive the PDSCH in a second default transmission mode (i.e., receive PDSCH using a second default value for transmission mode). For example, if the signal indicates that the network is an LTE Release 8/9/10 network, then the UE may adopt a Release 8/9/10 default transmission mode—tm1 or tm 2—in which the PDSCH is received based on CRS. If, on the other hand, the signal indicates that the network is an LTE Release 11 (or other future release) network, then the UE may adopt a Release 11 default transmission mode—tm9—in which the PDSCH is received based on DMRS. The UE can receive PDSCH using the second default transmission mode until it receives a higher layer message configuring the UE to receive PDSCH using a different transmission mode (i.e., a configured transmission mode rather than a default transmission mode).

The signal from the network can include one or multiple bits of information transmitted by an eNB in the network. The bits may be transmitted as part of MIB or one of the SIBs. In one implementation, the signal from the network is a message (included in MIB or SIBs) that explicitly indicates parameters relevant for receiving PDSCH using the second default transmission mode. For example, the parameters can include DMRS antenna ports based on which PDSCH is received in the second default transmission mode, and/or, information indicating zero power CSI-RS RE locations based on which the UE determines the REs used for receiving PDSCH in the second default transmission mode, and/or, information indicating non-zero power CSI-RS RE locations based on which the UE determines the REs used for receiving PDSCH in the second default transmission mode. Alternately, the signal from the network may be one or more of PSS (Primary synchronization signal), SSS (secondary synchronization signal), CRS (cell-specific reference signal) or CSI-RS (CSI reference signal or Channel state information reference signal). In one implementation, if UE determines from the Synchronization Signals that it is operating on a first carrier type (e.g. a type that supports only EPDCCH), it will use tm9 as the default value of transmission mode for receiving PDSCH. Otherwise, if it determines from the Synchronization Signals that it is operating on a legacy carrier type (e.g. a type that supports only PDCCH or both PDCCH and EPDCCH), it will use tm1/tm2 as the default value for tm.

Figure 8:
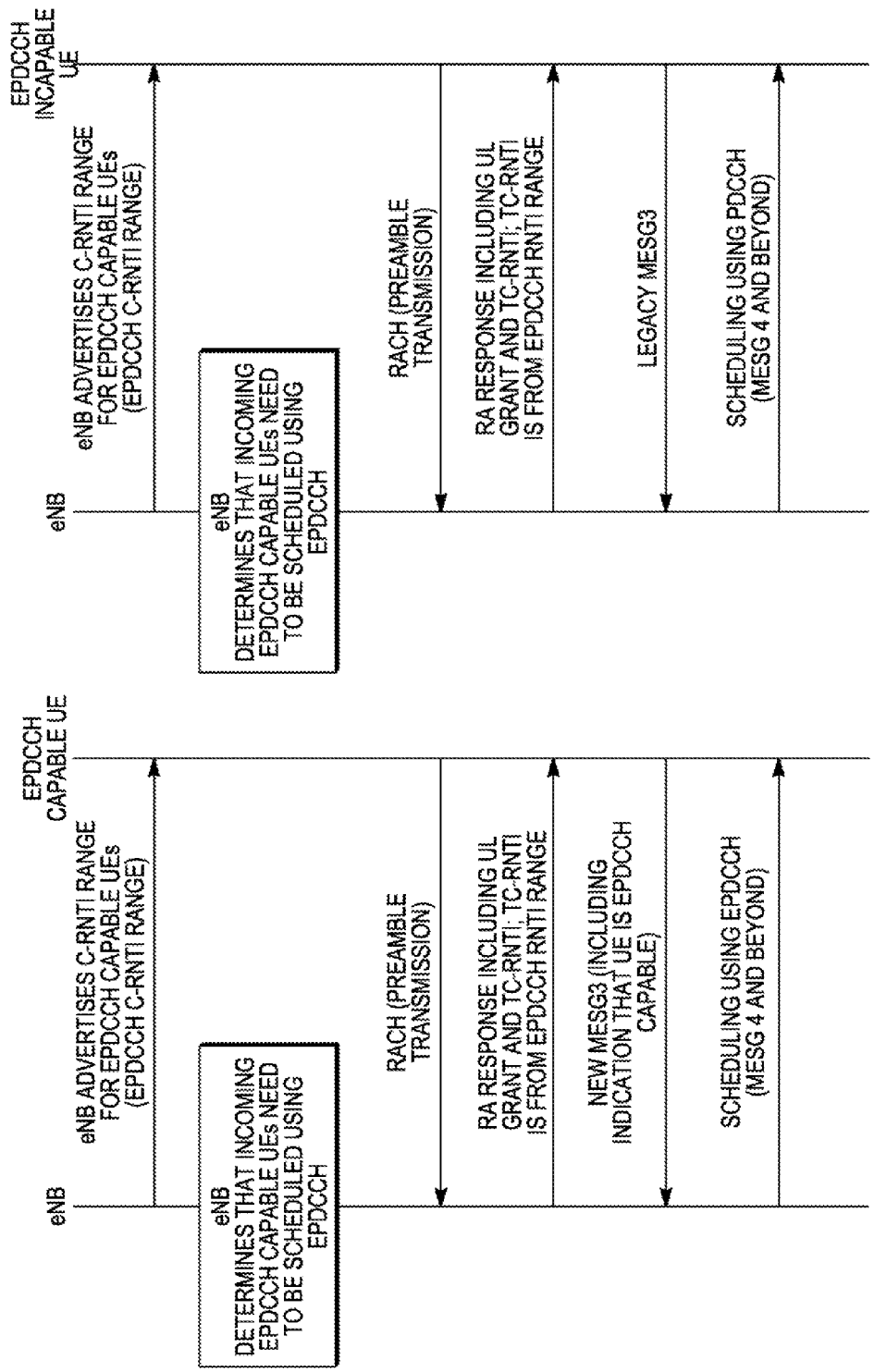

In an embodiment, illustrated in FIG. 8, if control and balancing of load between PDCCH and EPDCCH is necessary, then the temporary C-RNTI can be used to control when UEs will indicate that they are EPDCCH capable. In this implementation (1) The network reserves a C-RNTI range to be used for EPDCCH capable UEs. This range can be advertised in system information or can be fixed in a commonly understood specification. The network subsequently determines a need to schedule incoming EPDCCH capable UEs using EPDCCH. (2) The UE transmits a RACH preamble as part of a connection establishment procedure. (3) If there is available EPDCCH capacity, the TP responds with an RACH response including an UL grant and a TC-RNTI from the C-RNTI range for EPDCCH capable UEs. (3)(a) A Rel 11 EPDCCH capable UE recognizes the TC-RNTI as belonging to range. The UE transmits a new msg3. (3)(b) A UE not capable of EPDCCH (including legacy UEs) transmits a legacy msg 3. (4) If the TP receives a new msg3, it schedules a msg4 and subsequent transmissions to the UE using EPDCCH. Otherwise the TP uses PDCCH. If contention resolution succeeds, the UE uses the TC-RNTI of step 3 as the C-RNTI. It should be noted that the reserved C-RNTI range is not exclusive to EPDCCH capable UEs. That is, all EPDCCH capable UEs receive TC-RNTIs from the reserved C-RNTI range, but non-EPDCCH capable UEs may also receive TC-RNTIs from this range.

In some embodiments, the resource allocation (e.g. location of the PRBs within the transmission bandwidth configuration of a carrier) in the scheduling grant for the RACH response (msg2) can be used to implicitly indicate whether EPDCCH or PDCCH or a combination of EPDCCH and PDCCH (on the same or different subframes) is to be used or supported for a Rel-11 or later UE. A UE not capable of EPDCCH (including legacy UEs) would monitor only PDCCH. Alternatively, the resource allocation (e.g. location of the PRBs) for the msg3 uplink transmission can indicate whether EPDCCH or PDCCH or a combination of EPDCCH and PDCCH (on the same or different subframes) is to be used for a Rel-11 or later UE.

In one embodiment of the invention, the CSS is monitored for the PDCCH only in sub-frames not configured as MBSFN sub-frames (e.g., sub-frames 0, 4, 5, or 9). In such a scenario, the number of EPDCCH UESS blind decoding candidates in MBSFN sub-frames can be increased. For example, in subframes configured as MBSFN subframes the UE may perform blind decoding for 44 EPDCCH candidates (e.g 8 candidates at aggregation level 1, 8 candidates at aggregation level 2, 3 candidates at aggregation level 4 and 3 candidates at aggregation level 8 for two different DCI format sizes), in subframes not configured as MBSFN subframes, the UE may perform blind decoding for 32 EPDCCH candidates (e.g 6 candidates at aggregation level 1, 6 candidates at aggregation level 2, 2 candidates at aggregation level 4 and 2 candidates at aggregation level 8 for two different DCI format sizes).

EPDCCH Monitoring—Handover Scenarios

When a UE gets handed over from one serving cell to a different serving cell (e.g. based on the handover message(s)), the EPDCCH configuration may be included in a handover message.

FIG. 9 shows an example. The UE monitors CSS using PDCCH. To determine the mapping of PDCCH REs the UE uses a first cell ID. The UE also monitors UESS using EPDCCH. The UE may determine the mapping of EPDCCH REs using a previously determined EPDCCH configuration (e.g., based on a default EPDCCH configuration and/or additional EPDCCH configuration signaled by the network). The UE receives a handover message ordering the UE to handover from the first cell to a second cell. In some implementations, a handover message is a "RRCConnectionReconfiguration" message including a "mobilityControlInfo" information element. After receiving the handover message, the UE continues to monitor a CSS using PDCCH. However, to determine the mapping of PDCCH REs, the UE uses a second cell ID (cell ID of the second cell). After receiving the handover message, the UE also continues to monitor a UESS using EPDCCH. However, to determine the mapping of EPDCCH REs, the UE uses information in the handover message.

In one implementation (as shown in FIG. 9), the information in the handover message is a new EPDCCH configuration that is received in the handover message. The new EPDCCH configuration can include information identifying a set of PRB-pairs (Physical resource block pairs) of the second cell that the UE monitors for the EPDCCH. The set of PRB-pairs is usually smaller than the transmission bandwidth configuration of the carrier associated with the second cell. For example, if the transmission bandwidth configuration of the carrier is 100 RBs (this corresponds to 20 MHz carrier bandwidth, each RB can logically correspond to a PRB-pair), the new EPDCCH configuration can include information identifying a set of 4 RB-pairs within the 100 RBs. The new EPDCCH configuration can also include information identifying a set of antenna ports based on which the UE can receive EPDCCH in the second cell. The new EPDCCH configuration can also include information using which the UE can determine the EPRE (energy per resource element) of the REs (resource elements) on which it receives EPDCCH of the second cell.

In another implementation, the handover message can include an identifier associated with the second cell (e.g. PCID of second cell). The UE can implicitly determine a set of PRB-pairs of the second cell (for EPDCCH monitoring) based on the identifier. The UE may also implicitly determine a set of antenna ports of the second cell (for EPDCCH monitoring) based on the identifier associated with the second cell. Alternately, the UE may use the same antenna ports that were used for EPDCCH monitoring in the first cell.

In some implementations, if a new EPDCCH configuration is not received in the handover message, the UE continues using its current EPDCCH configuration for monitoring UESS of the second cell.

Another approach to enable EPDCCH monitoring after handover is to allow the UE to monitor EPDCCH based on a new default EPDCCH configuration after handover. FIG. 10 shows an example. The UE monitors EPDCCH using a default EPDCCH configuration of a first cell (default config.) and an additional EPDCCH configuration (additional config.). The UE may determine the default EPDCCH configuration of the first cell implicitly based on an identifier associated with the first cell. For example, the UE may use signals such as PSS (Primary synchronization signal), SSS (secondary synchronization signal), CRS (cell-specific reference signal) or CSI-RS (CSI reference signal or Channel state information reference signal) to determine an identifier associated with the first cell. Alternately, the UE may determine the default EPDCCH configuration of the first cell based on a field or information element received in a MIB (Master Information Block) or one of the SIBs (System Information Blocks, e.g. SIB1 or SIB2). The UE may receive the additional EPDCCH configuration in a dedicated RRC message (e.g. a "RRCConnectionReconfiguration" message that includes a "radioResourceConfigDedicated" field). The UE receives a handover message indicating the UE to handover from the first cell to a second cell. After receiving the handover message, the UE discontinues EPDCCH monitoring using the additional EPDCCH configuration and switches to EPDCCH monitoring using a new default EPDCCH configuration associated with the second cell. The UE can determine the new default EPDCCH configuration of the second cell implicitly based on an identifier associated with the second cell. Alternately, the UE may determine the default EPDCCH configuration of the second cell based on a field or information element received in a MIB (Master Information Block) or one of the SIBs (System Information Blocks, e.g. SIB1 or SIB2) after receiving the handover message.

In some implementations, the UE receives a handover message indicating the UE to handover from the first cell to a second cell and the UE monitors EPDCCH using a new default EPDCCH configuration if an EPDCCH configuration is not received in the handover message.

In some cases when the UE gets handed over from a first cell to a second cell, the UE may have to discontinue EPDCCH monitoring and start monitoring PDCCH. This can happen for example when the second cell does not support EPDCCH or has not allocated any resources for EPDCCH. To enable the UE to quickly start monitoring a control channel after handover (either PDCCH or EPDCCH depending on the use case) it is beneficial to include an indication in the handover message based on or which the UE uses to decide which control channel to monitor.

Figure 11:
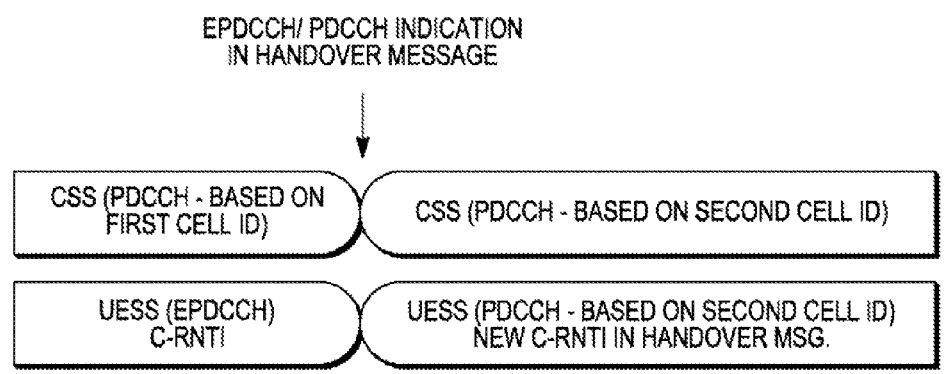

FIG. 11 shows an example. The UE monitors CSS using PDCCH. To determine the mapping of PDCCH REs the UE uses a first cell ID. The UE also monitors UESS using EPDCCH. The UE may determine the mapping of EPDCCH REs using previously determined EPDCCH configuration (e.g., based on a default EPDCCH configuration and/or additional EPDCCH configuration). The UE receives a handover message indicating the UE to handover from the first cell to a second cell. After receiving the handover message, the UE continues to monitor a CSS using PDCCH. However, to determine the mapping of PDCCH REs, the UE uses a second cell ID (cell ID of the second cell). Within the handover message, the UE receives an indication based on which it determines whether to monitor UESS using PDCCH or EPDCCH. The indication can be explicit (e.g. an information element or field in the handover message). Alternately, the indication can be implicit. For example, the UE monitors UESS using EPDCCH in the second cell if a specific field (e.g. EPDCCH configuration field) is present in the handover message, and it monitors UESS using PDCCH if the specific field is absent in the handover message. Another example of implicit indication can be—if a "transmissionMode" field in the handover message configures the UE to use a first transmission mode (e.g., tm1 or tm2 or . . . tm8), the UE monitors UESS using PDCCH in the second cell, and if the field in the handover message configures the UE to use a second transmission mode (e.g., tm9) the UE monitors UESS using EPDCCH in the second cell.

In another approach, the UE receives a handover message indicating the UE to handover from the first cell to a second cell. After receiving a handover message, the UE transmits a handover complete message. The handover complete message can indicate whether the UE is EPDCCH capable. The UE also transmits a RACH after receiving the handover message (using the RACH configuration included in the handover message). After transmitting a RACH, the UE receives a RACH response. The UE determines whether to monitor EPDCCH based on an indication in the RACH response (e.g. based on the TC-RNTI field).

In some implementations, in order for a new UE (e.g. Rel11 or Rel12 UE) to operate in both a legacy network (i.e., a network that does not support EPDCCH) and a "new network" the UE can have two modes. (1) In a first mode (legacy mode), the UE monitors its CSS/UESS using PDCCH (2) In a second mode (new mode or non-legacy) the UE monitors its CSS/UESS using EPDCCH The UE can determine whether to operate in legacy mode or new mode based on spare bits in MIB (received on a CRS based Physical Broadcast Channel—PBCH), or by looking for a new MIB (received on a DMRS based Enhanced Physical Broadcast Channel—EPBCH).

In one implementation the UE receives spare bits in a MIB and the spare MIB bits tell the UE to receive a new MIB. The UE determines a default EPDCCH configuration using information in either spare bits in the MIB or the new MIB.

In one example, one of the spare MIB bits is set to '0' (or first value) in the legacy network and the bit is set to '1' (or second value) in the new network. If a new UE reads the '0' value (or first value) for the specified MIB bit, it monitors PDCCH based CSS/UESS. If the UE reads the '1' value (or second value) for the specified MIB bit, it monitors EPDCCH based CSS/UESS.

In a network that supports both new UEs and legacy UEs, the network has to distinguish between new UEs and legacy UEs. The network do this by configuring the new UEs to use a reserved set of time/frequency/code domain RACH resources that may be different from (or a subset of) the RACH resources used by the legacy UEs. This configuration information can be signalled to the UEs using one or multiple bits of information transmitted by an eNB in the network. For instance, the bits may be transmitted as part of MIB (sent on PBCH) or one of the SIBs (sent on PDSCH RBs assigned via CSS PDCCHs whose CRC is scrambled with SI-RNTI). If MIB signaling is used, in one instance, one of the reserved MIB bits is set to '0' (or first value) in the legacy network and the bit is set to '1' (or second value) in the new network. If a new UE reads the '0' value (or first value) for the specified MIB bit, it uses the "default RACH resources" for transmitting a RACH. "Default RACH resources" may be same as the resources that Rel8/9/10 UEs use for RACH transmission and these are typically communicated in a SIB2. If the new UE reads the '1' value (or second value) for the specified MIB bit, it uses "new RACH resources" for transmitting a RACH. Information about the "new RACH resources" can be communicated to the UE using an extension to SIB2. Alternately, the UE may determine the new RACH resources using information about the old RACH resources and a predefined mapping rule. The new RACH resources may be a set of RBs that are different from the RBs used by Rel8/9/10 UEs for RACH transmission. Alternately, the new RACH resources may be a set of sub-frames that are different from the sub-frames used by Rel8/9/10 UEs for RACH transmission. Alternately, the new RACH resources may be a set of code sequences that are different from the code sequences used by Rel8/9/10 UEs for RACH transmission. Alternately, the new RACH resources may be a set of preambles that are different from the preambles used by Rel8/9/10 UEs for RACH transmission. Alternately, the new RACH resources may be a different combination of RB/sub-frame/code-sequence/preamble than the RB/sub-frame/code-sequence/preamble combination used by rel8/9/10 UEs. A Rel11 UE that transmits RACH in the new RACH resources can monitor EPDCCH CSS/UESS after receiving TC-RNTI.

Dynamically Determining Whether to Use PDCCH or EPDCCH

Figure 12:
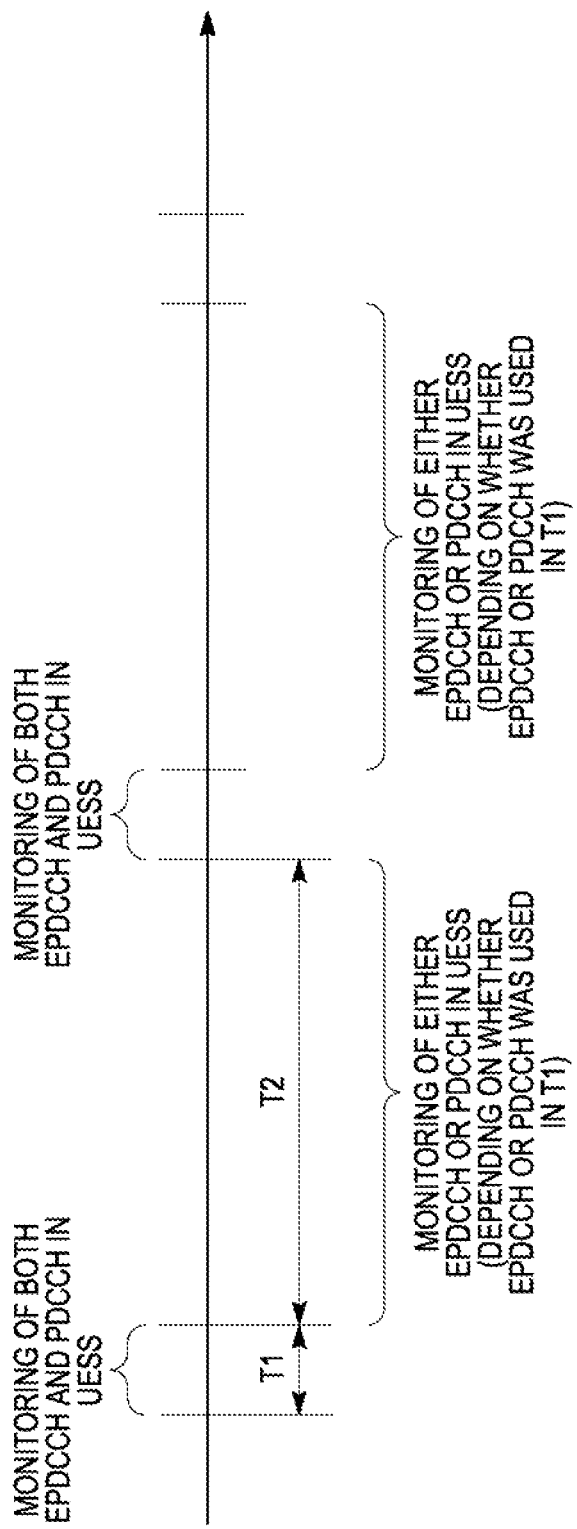

In an embodiment of the invention illustrated in FIG. 12, the UE is configured with periodic intervals (T1) during which it is required to monitor both PDCCH and EPDCCH on UESS. During these intervals, the eNB may schedule the UE using either PDCCH or EPDCCH. However, the blind decodes are split between PDCCH and EPDCCH (not all aggregation levels can be used for EPDCCH).

For example, if the UE is scheduled using EPDCCH during T1, it only monitors for EPDCCH until the next occurrence of T1. That is, after the first EPDCCH based scheduling, UE switches to EPDCCH-only mode and monitors EPDCCH at all aggregation levels. After receiving ACK (positive acknowledgement) to first EPDCCH based transmission, network assumes UE has switched to EPDCCH-only mode. Likewise, if UE is scheduled using PDCCH during T1, it monitors PDCCH at all aggregation levels until the next occurrence of T1.

Variations are possible. For example, (1) The duration T1 can be fixed. The mode in T2 could be based on the last control channel received in T1 (i.e. switching of modes happens precisely at the end of T1 rather than when UE is first scheduled). (2) If UE is not scheduled during T1, it can use a default mode during T2 (e.g., PDCCH-only).

It is to be noted that the start of T1 can be aligned with the start of DRX on duration. This results in having a short window at the start of each DRX on duration where the UE monitors for both PDCCH and EPDCCH and subsequently monitors only one of the two, based on what was used for scheduling in the short window. T2 can include periods where the UE is in active time (i.e., monitoring PDCCH or EPDCCH) and the periods where the UE is in DRX (i.e., a low power sleep mode where it is not monitoring either PDCCH or EPDCCH)

It can be seen from the foregoing that a novel and useful method and system for receiving a control channel has been described. It is to be noted that embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the disclosure, which are to be limited not by the exemplary embodiments but by the appended claims.

LIST OF ACRONYMS

BS Base Station
CCE Control Channel Element
CoMP Coordinated Multi-Point
CP Cyclical Prefix
CQI Channel Quality Indicator
CRC Cyclic Redundancy Check
C-RNTI Cell RNTI
CQI Channel Quality Information
CRS Common Reference Signal CSI Channel State Information
CSI-RS Channel State Information Reference Signal
CSS Common Search Space
DCI Downlink Control Information
DL Downlink
DMRS Demodulation Reference Signal
eNB Evolved Node B
EPBCH Enhanced Physical Broadcast Channel
EPDCCH Enhanced Physical Downlink Control Channel
EPRE Energy Per Resource Element
E-UTRA Evolved UTRA
FFT Fast Fourier Transform
HARQ Hybrid Automatic Repeat Request
LTE Long-Term Evolution
MAC Media Access Control
MBSFN Multicast-Broadcast Single Frequency Network
MCS Modulation and Coding Schemes
MIB Master Information Block
MIMO Multiple-Input Multiple-Output
MU-Multi-User MIMO
MIMO
OFDMA Orthogonal Frequency Division Multiple Access
P/S-SCH Primary/Secondary Synchronization Channel
PBCH Primary Broadcast Control Channel
PCID Physical Cell Identifier
PDCCH Physical Downlink Control Channel
PDCP Packet Data Convergence Protocol
PDSCH Physical Downlink Shared Channel
PHICH Physical Hybrid ARQ Channel
PRB Physical Resource Block
P-RNTI Paging RNTI
PSS Primary Synchronization Signal
QAM Quadrature Amplitude Modulation
QPSK Quadrature Phase Shift-Keying
RACH Random Access Channel
RB Resource Block
RE Resource Element
REG Resource Element Group
RF Radio Frequency
RNC Radio Network Controller
RNTI Radio Network Temporary Identifier
RRC Radio Resource Control
RRH Remote Radio Head
RS Reference Signal
SFN System Frame Number
SIB System Information Block
SI-RNTI System Information RNTI
S-RNTI Serving RNC RNTI
SSS Secondary Synchronization Signal
TC-RNTI Temporary Cell RNTI
tm Transmission Mode
TP Transmission Point
UE User Equipment
UERS UE-specific Reference Symbol
UESS UE-Specific Search Space
UL Uplink
UMTS Universal Mobile Telecommunications System
U-RNTI UTRAN RNTI
UTRAN UMTS Terrestrial Radio Access Network

What is claimed is:

1. A method in a communication device, the method comprising:
monitoring a first control channel;
receiving information from the network regarding a configuration of a second control channel;
during a random access procedure between the communication device and the network:
receiving an uplink grant from the network; and
transmitting a message to the network, the message including an indication that the communication device is capable of monitoring a second control channel; and
monitoring the second control channel based on the received configuration information.

2. The method in claim 1 wherein receiving an uplink grant from the network comprises:
transmitting a random access preamble to the network; and
receiving the uplink grant from the network in response to the random access preamble transmission.

3. The method of claim 1;
wherein the step of receiving the uplink grant comprises being granted resources that are usable by the communication device to transmit messages to the network; and
wherein the step of transmitting message to the network comprises transmitting the message using the granted resources.

4. The method of claim 3 wherein the granted resources include one or more resource blocks.

5. The method of claim 1 wherein the communication device is in a first mode for receiving downlink data, the method further comprising:
receiving, via the first control channel, an identification of a second mode for receiving downlink data; and
receiving downlink data using the second mode.

6. The method of claim 1 further comprising:
receiving downlink control information via the second control channel; and
using the downlink control information to decode data received on a data channel from the network.

7. The method of claim 1 wherein the step of monitoring the second control channel comprises:
attempting to decode downlink control information on a set of time-frequency resources received on a sub-frame from the network; and
if the attempt is successful, reading the control information contained in the decoded time-frequency resource.

8. A communication device comprising:
a processor; and
a transceiver;
wherein the processor and the transceiver cooperate to perform steps comprising:
monitoring a first control channel;
receiving information from the network regarding a configuration of a second control channel;
during a random access procedure between the communication device and the network:
receiving an uplink grant from the network and
transmitting a message to the network, the message including an indication that the communication device is capable of monitoring a second control channel; and
monitoring the second control channel based on the received configuration information.

* * * * *